US008826788B2

(12) United States Patent
Rybka

(10) Patent No.: US 8,826,788 B2
(45) Date of Patent: Sep. 9, 2014

(54) WORK PIECE GUIDE ASSEMBLY FOR TABLE SAW

(75) Inventor: Matthew M. Rybka, Hoffman Estates, IL (US)

(73) Assignee: Robert Bosch GmbH, Stuttgart (DE)

( * ) Notice: Subject to any disclaimer, the term of this patent is extended or adjusted under 35 U.S.C. 154(b) by 1049 days.

(21) Appl. No.: 12/717,317

(22) Filed: Mar. 4, 2010

(65) Prior Publication Data

US 2011/0214541 A1 Sep. 8, 2011

(51) Int. Cl.

| | |
|---|---|
| ***B23D 15/00*** | (2006.01) |
| ***B26D 7/06*** | (2006.01) |
| ***B26D 7/01*** | (2006.01) |
| ***B26D 1/00*** | (2006.01) |
| ***B26D 1/14*** | (2006.01) |

(52) U.S. Cl.

CPC .. *B26D 1/00* (2013.01); *B26D 7/01* (2013.01); *B26D 1/14* (2013.01); *B26D 7/06* (2013.01)

USPC ............................. 83/435.15; 83/441; 83/446

(58) Field of Classification Search

CPC ................................ B26D 7/06; B26D 7/0608

USPC .............. 83/412, 425, 435.15–435.19, 467.1, 83/477.2, 441, 442, 446

See application file for complete search history.

(56) References Cited

U.S. PATENT DOCUMENTS

| | | | | | | |
|---|---|---|---|---|---|---|
| 2,522,965 | A | * | 9/1950 | Schaufelberger | ............... | 83/409 |
| 2,747,628 | A | * | 5/1956 | Ford | ......................... | 144/250.13 |
| 2,985,202 | A | * | 5/1961 | Wilson | ............................ | 83/431 |
| 4,485,711 | A | * | 12/1984 | Schnell | ........................... | 83/425 |
| 4,830,075 | A | | 5/1989 | Jenkner | | |
| 4,976,298 | A | * | 12/1990 | Gibson | .................... | 144/250.15 |
| 5,018,562 | A | | 5/1991 | Adams | | |
| 5,341,711 | A | | 8/1994 | Stay, Jr. et al. | | |
| 5,662,019 | A | | 9/1997 | Denman | | |
| 6,044,740 | A | | 4/2000 | Werkheiser | | |
| 6,135,521 | A | | 10/2000 | Wirth, Jr. et al. | | |
| 6,578,461 | B1 | | 6/2003 | Loo | | |
| 6,619,347 | B2 | | 9/2003 | Jukoff et al. | | |
| 7,341,081 | B1 | | 3/2008 | Villiger | | |
| 2002/0029822 | A1 | | 3/2002 | Jukoff | | |
| 2002/0096029 | A1 | | 7/2002 | Petersen | | |
| 2002/0144752 | A1 | | 10/2002 | Jones | | |
| 2006/0201297 | A1 | | 9/2006 | Friend | | |
| 2008/0092707 | A1 | | 4/2008 | Aigner | | |

* cited by examiner

*Primary Examiner* — Kenneth E. Peterson
*Assistant Examiner* — Samuel A Davies
(74) *Attorney, Agent, or Firm* — Maginot, Moore & Beck

(57) ABSTRACT

A work piece guide assembly is for use with a table saw having a fence that defines an elongated slot. The work piece guide assembly includes a body having a mating component configured to be received in the elongated slot of the fence. A handle for manipulating the guide assembly is supported by the body. The work piece guide assembly includes an arm having a first end portion pivotably mounted in relation to the body and a second end portion defining a work piece contact surface. A roller is rotatably connected to the second end portion of the arm.

3 Claims, 7 Drawing Sheets

WORK PIECE GUIDE ASSEMBLY FOR TABLE SAW

FIELD OF THE INVENTION

This invention relates to table saws, and particularly to work piece guides for use with table saws.

BACKGROUND

Table mounted cutting tools, such as table saws, are valuable tools used for a variety of tasks, such as cross-cutting wood, and ripping large boards or panels into narrow strips. While there are a variety of table saw designs, most table saws include a table structure having a planar support surface for supporting a workpiece, such as a piece of wood, and a cutting element, such as a circular saw blade, mounted below the support surface with a cutting portion of the cutting element extending through an opening in the support surface to perform cutting operations on the workpiece. In use, a workpiece is moved across the support surface of the table in a cutting direction and into contact with the cutting portion of the cutting element. The workpiece is moved in the cutting direction through the cutting element so that the cutting portion of the cutting element performs the desired cut on the workpiece.

When performing a cutting operation using a table mounted cutting tool, the motion of the workpiece relative to the support surface and the cutting element of a table saw is typically controlled, at least in part, by the hands of the operator. A variety of guide tools and attachments, also referred to as motion guides, are known in the art for aiding an operator in guiding a workpiece relative to the support surface and cutting element of a table saw. Such motion guides are typically configured to prevent or limit the movement of a workpiece relative to the support surface in directions other than the cutting direction (and possibly the reverse of the cutting direction so that work pieces may be withdrawn from cutting element). Thus, motion guides promote operator safety by allowing an operator to move the workpiece in the cutting direction without requiring the use of hands to hold the workpiece against the support surface, or the rip fence, in the vicinity of the cutting element.

For example, to perform straight cuts in a workpiece, such as rip cutting a wide and/or long workpiece into strips, the table saw is typically provided with a guide in the form of a rip fence. A rip fence is an elongate member having a flat guide surface arranged substantially perpendicular to the support surface of the table facing the cutting element. The rip fence is attached to the support surface so that the guide surface of the fence is located spaced apart from and generally parallel to the cutting line or cutting plane defined by the cutting element. In operation, a workpiece to be cut is placed on the support surface with a straight lateral edge of the workpiece abutted against the guide surface of the rip fence. The workpiece is then advanced across the support surface through the cutting element while maintaining the edge of workpiece in contact with the guide surface. A rip fence, thus, maintains consistent spacing between the edge of the workpiece and the cutting element so that the resulting strip cut from the workpiece has a uniform width.

Other previously known motion guides for use with table saws include guides for imparting a "down force" to the workpiece which urges the workpiece down against the support surface of the table. Guides may also be provided for imparting "lateral force" to the workpiece which urges the workpiece horizontally against the rip fence. Such guides typically include some form of workpiece contact member biased in some manner against the workpiece to impart a desired directional force thereto.

Another type of attachment or tool for use with table saws is referred to as a "push stick." A push stick is a device that enables an operator to impart an "advancing force" to the trailing end of a workpiece to advance the workpiece across the table support surface in the cutting direction while allowing the operator's hands to remain at a distance from the cutting element. A typical push stick is simply a notched stick that is configured to engage the rear edge of the work piece and used to push the work piece through the wood working equipment. Push stick type devices may also be provided as an integral fixture or as an attachment to the table saw support surface or rip fence.

Thus, table saws may be provided with various guides, tools, and attachments. In previously known table saw systems, a separate guide, tool, or attachment is needed in conjunction with a rip fence to achieve a desired "down force," "lateral force," and "advancing force" during cutting operations. Using a separate guide, tool, or attachment for each desired type of motion guidance, however, may increase the complexity of the operation of a table saw as well as increase the cost of using the table saw.

SUMMARY

In accordance with one embodiment, a work piece guide assembly is provided for use with a table saw having a fence that defines an elongated slot. The work piece guide assembly includes a body having a mating component configured to be received in the elongated slot of the fence. A handle for manipulating the guide assembly is supported by the body. The work piece guide assembly includes an arm having a first end portion pivotably mounted in relation to the body and a second end portion defining a work piece contact surface. A roller is rotatably connected to the second end portion of the arm.

In another embodiment, an apparatus is provided that includes a table assembly having (i) a base defining support surface, (ii) a saw mechanism supported by the base, and (iii) a fence supported by the base. The fence defines an elongated slot. The apparatus also includes a guide assembly having (i) a body with a mating component received in the elongated slot of the fence (ii) a handle supported by the body, (iii) an arm pivotably mounted in relation to the body and defining a work piece contact surface, and (iv) a roller rotatably connected to the arm.

In yet another embodiment, a method of guiding a work piece on a table assembly using a guide assembly is provided, wherein (i) the table assembly includes a base defining a support surface, (ii) a saw mechanism supported by the base, and a fence supported by the base, the fence defining an elongated slot, and (ii) the guide assembly including a body having a mating component received in the elongated slot of the fence, a handle supported by the body, an arm pivotably connected in relation to the body and defining a contact surface, and a roller rotatably connected to the arm. The method comprises advancing a work piece on the support surface while the roller of the guide assembly is biased against a top surface of the work piece and the guide assembly is maintained in fixed relation to the fence. The work piece is advanced on the support surface until (i) the roller becomes spaced apart from the top surface, and (ii) the contact surface of the arm becomes positioned in contact with the work piece. After the contact surface of the arm is positioned in contact with the work piece, the guide assembly is moved in relation to the fence so as to cause the work piece to further advance on the support surface while the contact surface of the arm is positioned in contact with the work piece.

DESCRIPTION

Figure 1:
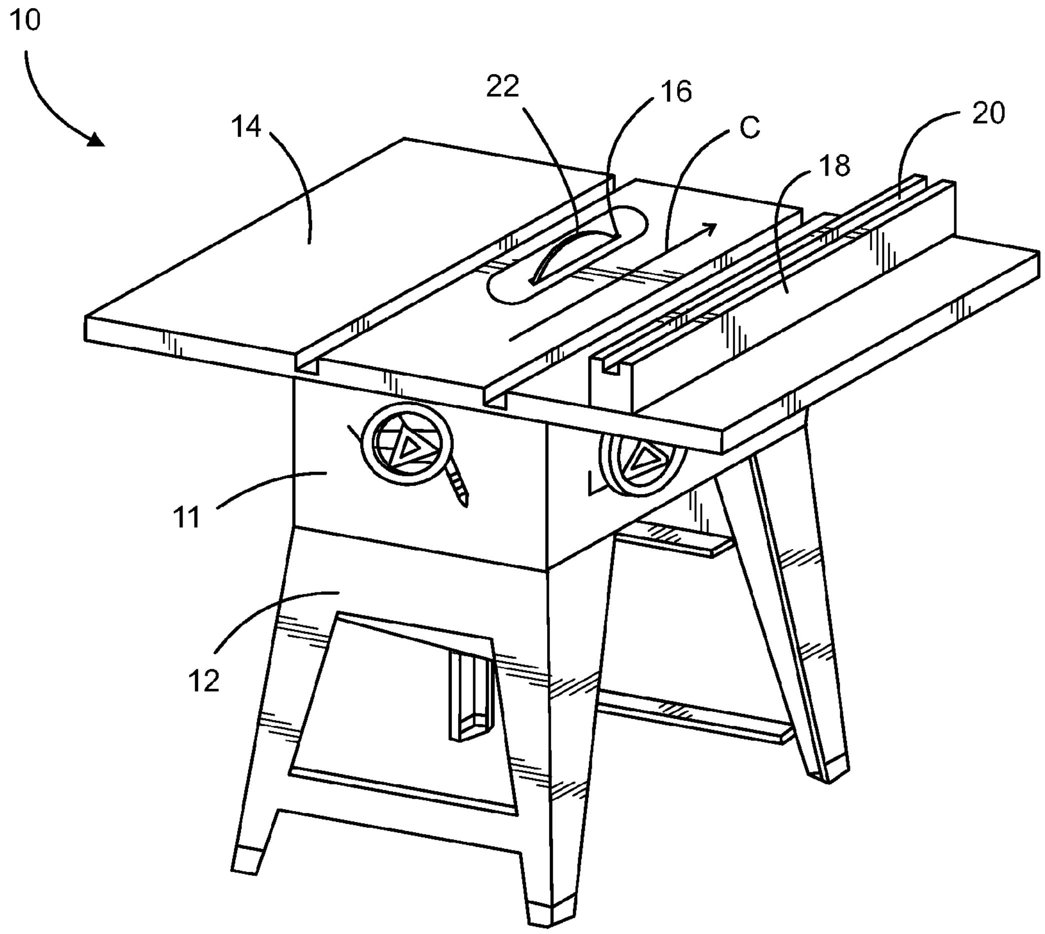
FIG. 1 depicts a perspective view of a table saw assembly having a rip fence with an elongate slot for receiving a work piece guide assembly of the present disclosure.
Figure 2:
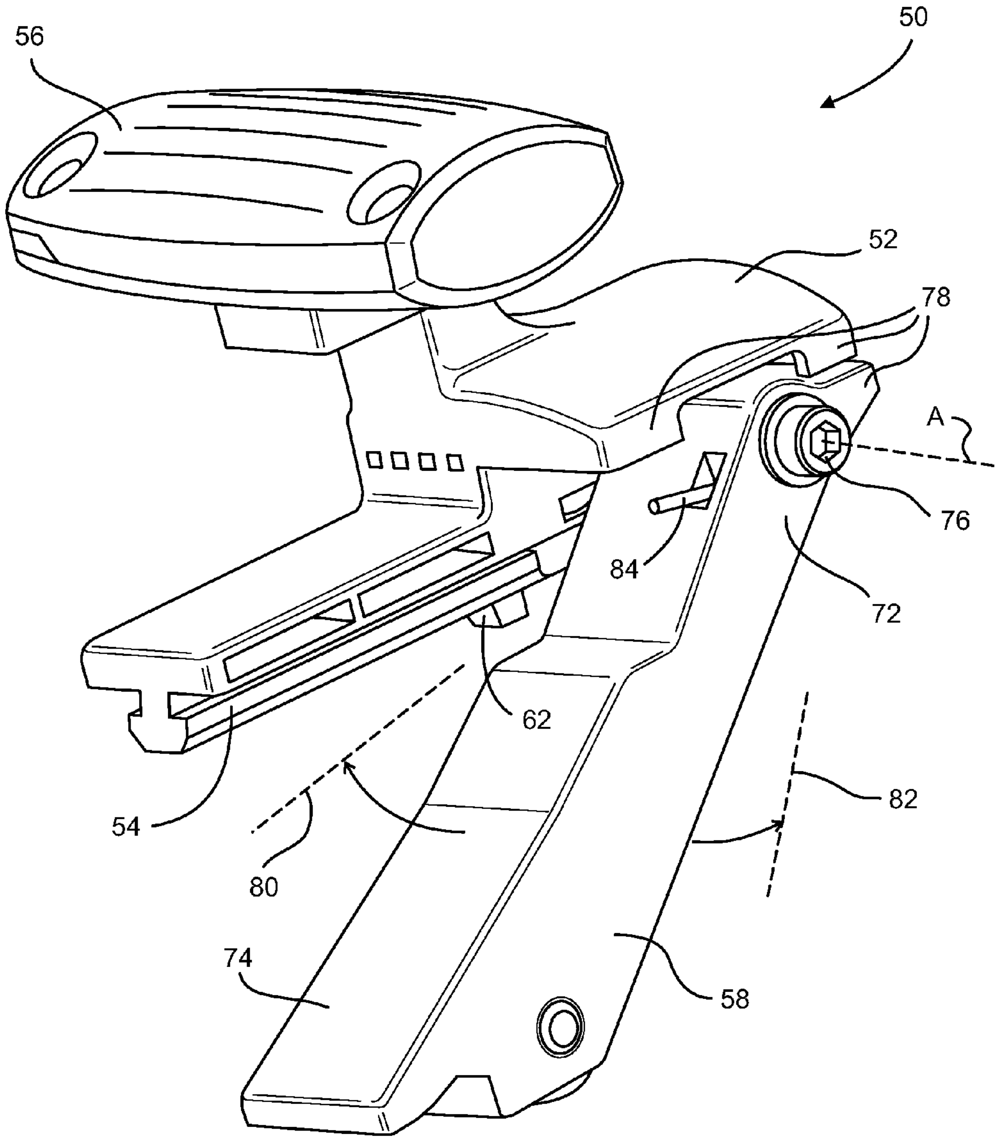
FIG. 2 depicts a perspective view of an embodiment of a work piece guide assembly that is configured for use with the table saw assembly of FIG. 1.

For the purposes of promoting an understanding of the principles of the invention, reference will now be made to the embodiments illustrated in the drawings and described in detail herein. It should be understood that no limitation to the scope of the invention is thereby intended. It should be further understood that the present invention includes any alterations and modifications to the illustrated embodiments and includes further applications of the principles of the invention as would normally occur to one of ordinary skill in the art to which this invention pertains.

FIG. 1 depicts an exemplary table saw assembly 10 with which a work piece guide assembly 50 (FIGS. 2-6) of the present disclosure may be used. As depicted, the table saw 10 has a base 12 that defines an enclosure 11 and a planar top surface 14, also referred to herein as a support surface. The enclosure 11 houses an electric motor (not shown) having a shaft (not shown) upon which a cutting tool 22, such as a circular saw blade 22, is mounted for rotation. The cutting tool 22 extends through an opening 16 in the support surface 14 of the table assembly and is configured to perform work, i.e., to cut, a work piece (not shown) that is supported on the support surface 14 and being advanced with respect to the support surface 14 in a cutting direction C.

Attached to the support surface 14 is a fence 18, also referred to as a rip fence. The rip fence 18 serves as a guide to assist operators of the table saw 10 in making lengthwise cuts through a work piece. As depicted in FIG. 1, the rip fence 18 comprises an elongate member attached to the support surface 14 spaced apart from and generally parallel to the cutting direction C. The rip fence 18 includes a vertical guide surface 24 (not visible in FIG. 1) that faces the cutting tool 22. In operation, a work piece to be cut is placed on the support surface 14 with a straight lateral edge of the work piece abutted against the vertical guide surface of the rip fence. The work piece is then advanced across the support surface 14 in the cutting direction C while maintaining the edge of work piece in contact with the vertical guide surface. The cutting tool 22, being driven by the motor, cuts the work piece as it is being advanced through the cutting tool 22.

Referring now to FIGS. 2-6, an embodiment of a work piece guide assembly 50 for use with a rip fence of a table saw, such as the rip fence 18 of table saw 10 of FIG. 1, is depicted. The work piece guide assembly 50 includes a body 52 having a mating component 54, a handle 56 extending from and supported by the body 52, and an arm 58 movably supported by the body 52. The body 52, handle 56, and arm 58 may be formed of any suitably sturdy, rigid material, such as plastic or metal. The work piece guide assembly 50 is configured to be attached to the rip fence 18 in a manner that enables the work piece guide assembly to be translated along the rip fence in the cutting direction C.

Figure 3:
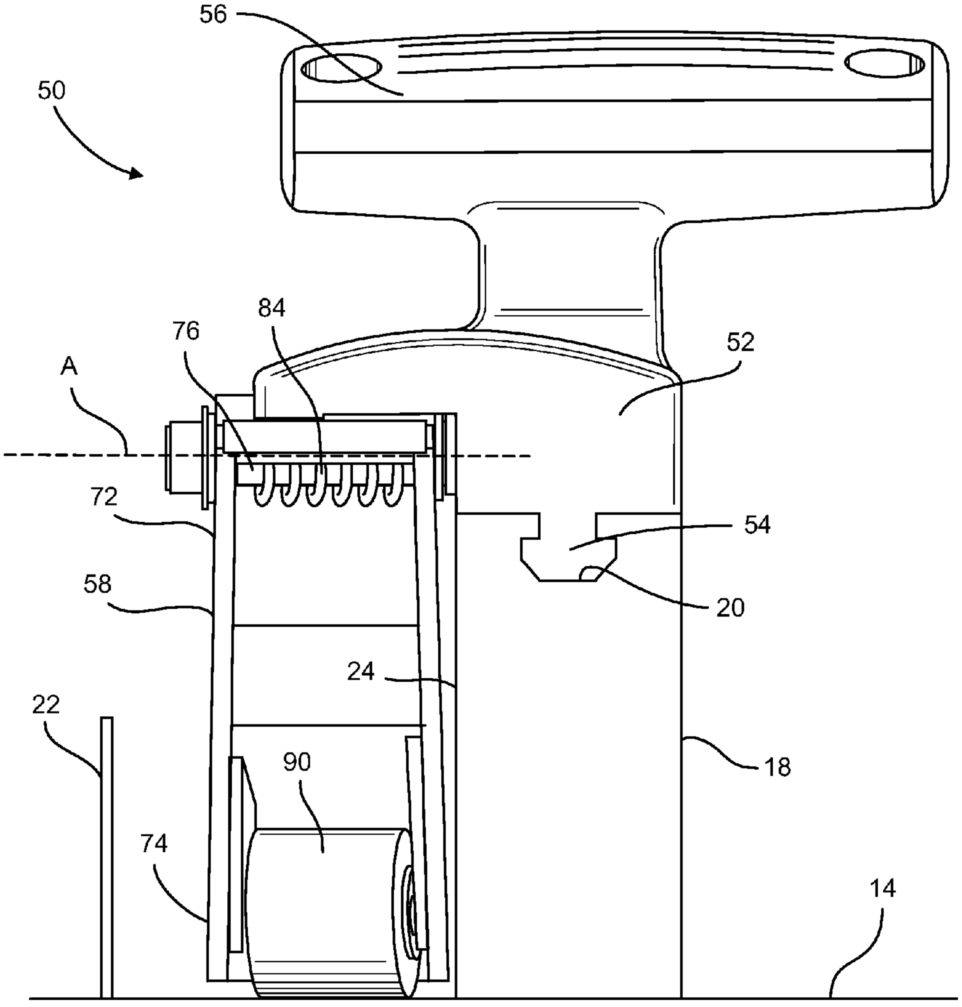
FIG. 3 is rear elevational view of the work piece guide assembly of FIG. 2 being used with the rip fence of FIG. 1.

To enable translational movement of the workpiece guide assembly 50 with respect to the table saw assembly 10, the rip fence 18 is provided with an elongate slot 20 that extends all or a portion of the length of the rip fence 18 as depicted in FIG. 1. The mating component 54 is complementarily configured with respect to the slot 20 so that the mating component is received in the slot in a manner that enables the body 52 to be secured to the rip fence while allowing translational movement of the body 52 in the slot 20. In one embodiment, the slot has an undercut groove configuration, such as a dovetail or T-shape in cross-section, as best seen in FIG. 3. The mating component 54 is a complementarily shaped protrusion that projects from the bottom of the body 52. The slot and mating component configuration described above is one of a number of possible mating configurations that may be used to enable the desired translational movement of the work piece guide assembly with respect to the rip fence. Any suitable method of attaching the work piece guide assembly 50 to the rip fence 18 to enable such movement may be utilized.

Figure 4A:
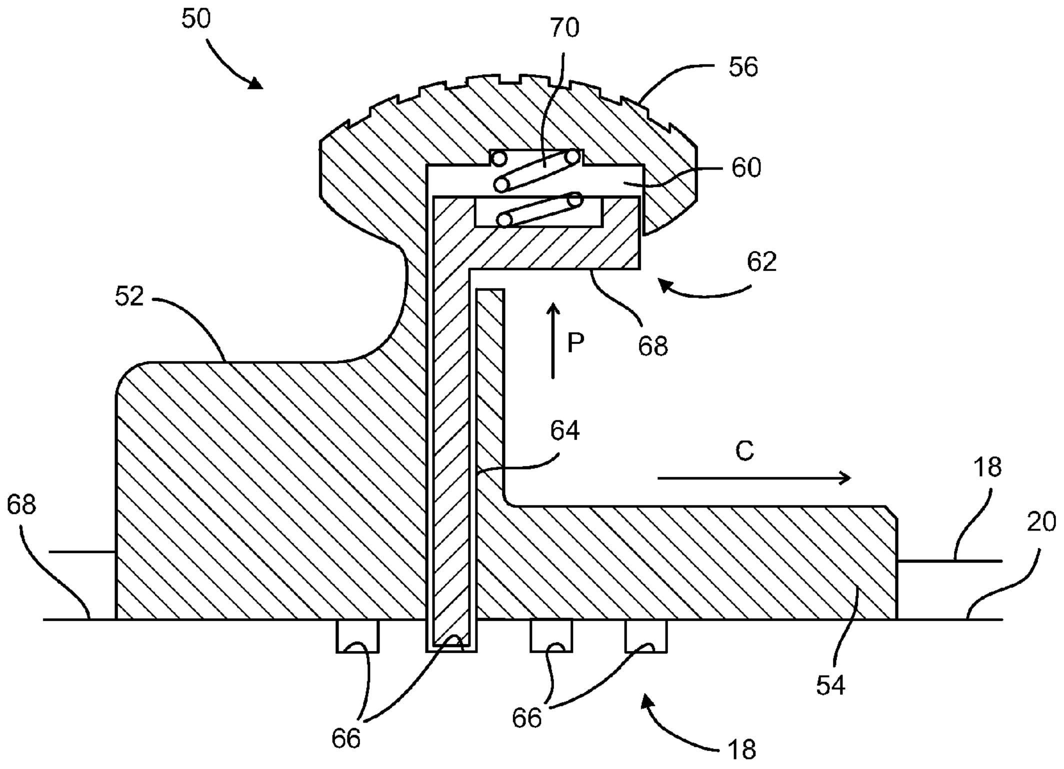
FIG. 4A depicts a cross-sectional view of the work piece guide assembly of FIG. 2 positioned on the rip fence of FIG. 1 in a locked position.
Figure 4B:
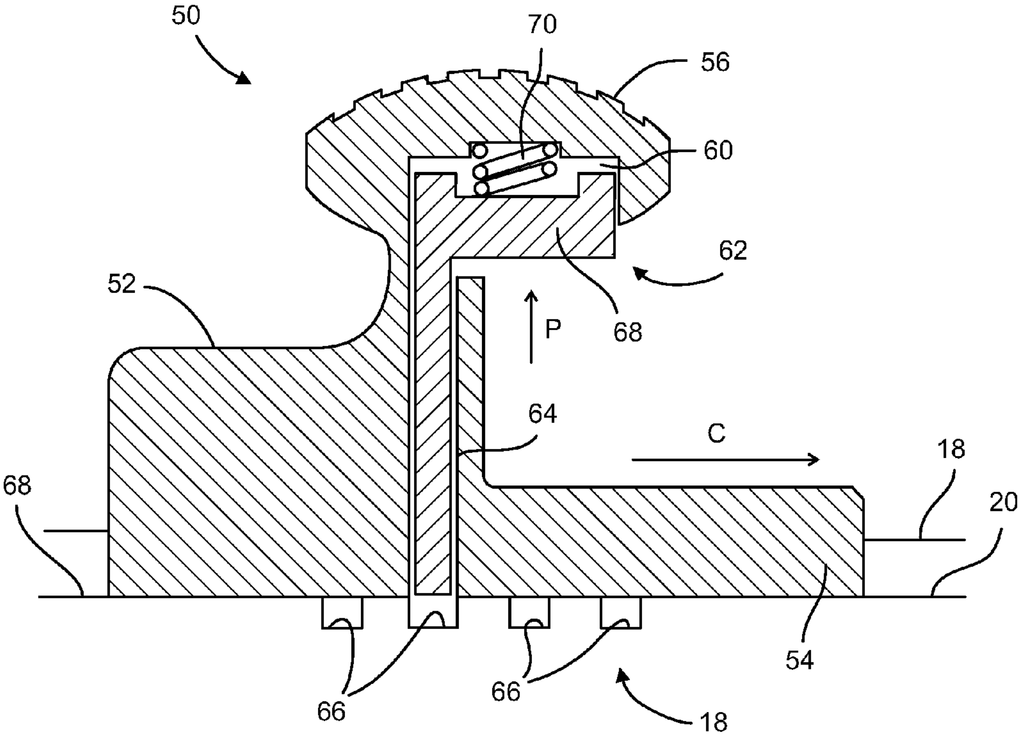
FIG. 4B depicts a cross-sectional view of the work piece guide assembly of FIG. 2 positioned on the rip fence of FIG. 1 in an unlocked position.

The body 52 and handle 56 of the guide assembly 50 cooperate to define a cavity 60 that houses a locking mechanism 62 for fixing the work piece guide assembly 50 to the rip fence 18 in at least one position in relation to the rip fence 18. As best seen in FIGS. 4A and 4B, the locking mechanism 62 comprises a locking pin or rod 64 that is supported within the cavity 60 defined by body 52 and handle 56 for axial movement between an unlocked position (FIG. 4B), at which the locking pin 64 is positioned substantially within the body 52 of the work piece guide assembly, and a locking position (FIG. 4A), at which the locking pin protrudes from the body 52 below the mating component 54. To enable the locking of the work piece guide assembly 50 to the rip fence, at least one recess 66 is defined in the bottom surface of the elongate slot 20 of the rip fence 18. As depicted in FIGS. 4A and 4B, a plurality of recesses 66 may be defined in the bottom surface 68 of the slot 20. Any suitable number of recesses 66 may be used. The recesses 66 are complementary configured with respect to the locking pin 64 to receive the locking pin 64 when the locking pin 64 is in its locking position (FIG. 4A).

The locking pin 64 is operably coupled to an actuator 68 that is configured to move the locking pin 64 between the unlocked and locking positions. In the embodiments of FIGS. 2-6, the actuator 68 comprises a pad or button coupled to the locking pin 64 and extending therefrom so that it protrudes from the handle 56 at a suitable location where it may be accessed and depressed by an operator. The actuator 68 is movably supported within the handle 56 so that when the pad 68 is depressed by an operator, the actuator 68 is moved from an un-depressed position (FIG. 4A) to a depressed position (FIG. 4B) which causes a corresponding movement of the locking pin 64 from its locking position to its unlocked position. A biasing member, such as spring 70, is positioned within the handle 56 to bias the actuator 68 into its undepressed position, thus biasing the locking pin 64 into its locking position. When it is desired to translate the work piece guide assembly 50 in relation to the rip fence 18, an operator depresses the actuator pad 68 to move the locking pin 64 to its unlocked position at which point the work piece guide assembly 50 may be moved in relation to the rip fence 18 in the cutting direction C.

With reference again to FIG. 2, the arm 58 of the work piece guide assembly 50 comprises a member having (i) a first end portion 72 located proximate the body 52 and (ii) a second end portion 74 located distally with respect to the body 52. The first end portion 72 of the arm 58 is pivotably coupled to a rod 76 that extends laterally from the body 52. As best seen in FIG. 3, with the mating component 54 of the body 52 mated with the slot 20 of the rip fence 18, the rod 76 serves to laterally offset the arm 58 from the rip fence 18 toward the cutting tool 22 thus positioning the arm 58 to serve as a motion guide for work pieces during operation of the table saw. The first end portion 72 of the arm is coupled to the rod 76 for at least partial rotation about an axis A defined by the rod 76. The body 52 and first end portion 72 of the arm 58 include structures 78, such as tabs or detents, that interact to constrain the rotation of the arm 58 about the axis A. In the exemplary embodiment, the rotational movement of the arm 58 is limited so that the arm is pivotable in relation to the body between an upper position 80 and a lower position 82. The upper position 80 and the lower position 82 are defined by the position of the second end portion of the arm 58 relative to the support surface 14 of the table saw (or a work piece supported thereon). In particular, when the arm 58 is in the upper position 80, the second end portion 74 of the arm is positioned farther from the support surface 14 than when the arm 58 is in the lower position 82. The arm 58 is biased toward the lower position 82 by a suitable biasing member 84, such as torsion spring. Any suitable method or manner of biasing the arm into the lower position, however, may be used.

Figure 6A:
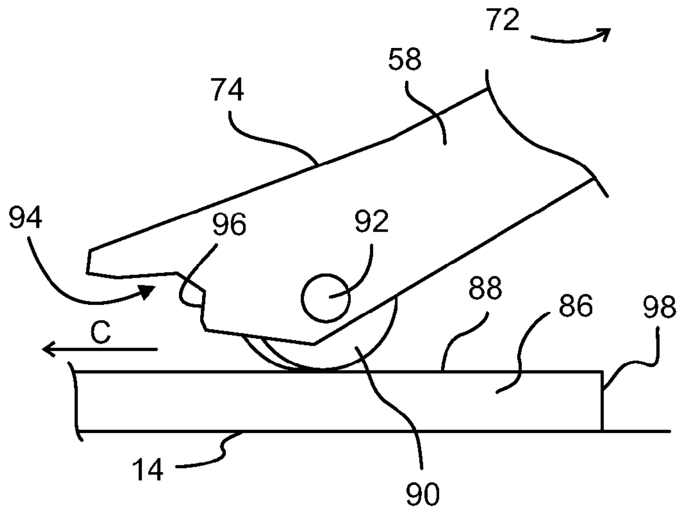
FIG. 6A depicts a side elevational view of the arm of the work piece guide assembly of FIG. 2 positioned over a work piece supported on the support surface of the table saw of FIG. 1.
Figure 6B:
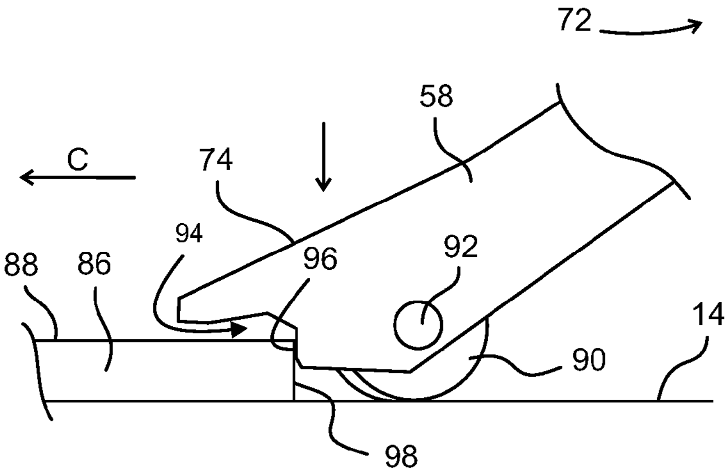
FIG. 6B depicts a side elevational view of the arm of the work piece guide assembly of FIG. 2 with the work contact surface positioned in contact with the trailing end of the work piece of FIG. 6A.

Referring now to FIGS. 6A and 6B, during operation of the table saw, a work piece 86 is placed on the support surface 14 and moved under the second end portion 74 of the arm toward the cutting element 22. The second end portion 74 of the arm is biased into contact with a top surface 88 of the work piece 86 by the biasing member 84 thereby providing a down force for maintaining the work piece 86 in contact with the support surface 14 during operation. To facilitate movement of a work piece 86 under the second end portion 74 of the arm, the second end portion 74 is provided with a roller 90 rotatably supported by a pin 92 attached to the second end portion 74 of the arm 58. The pin 92 defines a pin axis P that corresponds to the axis of rotation of the roller 90.

Figure 5:
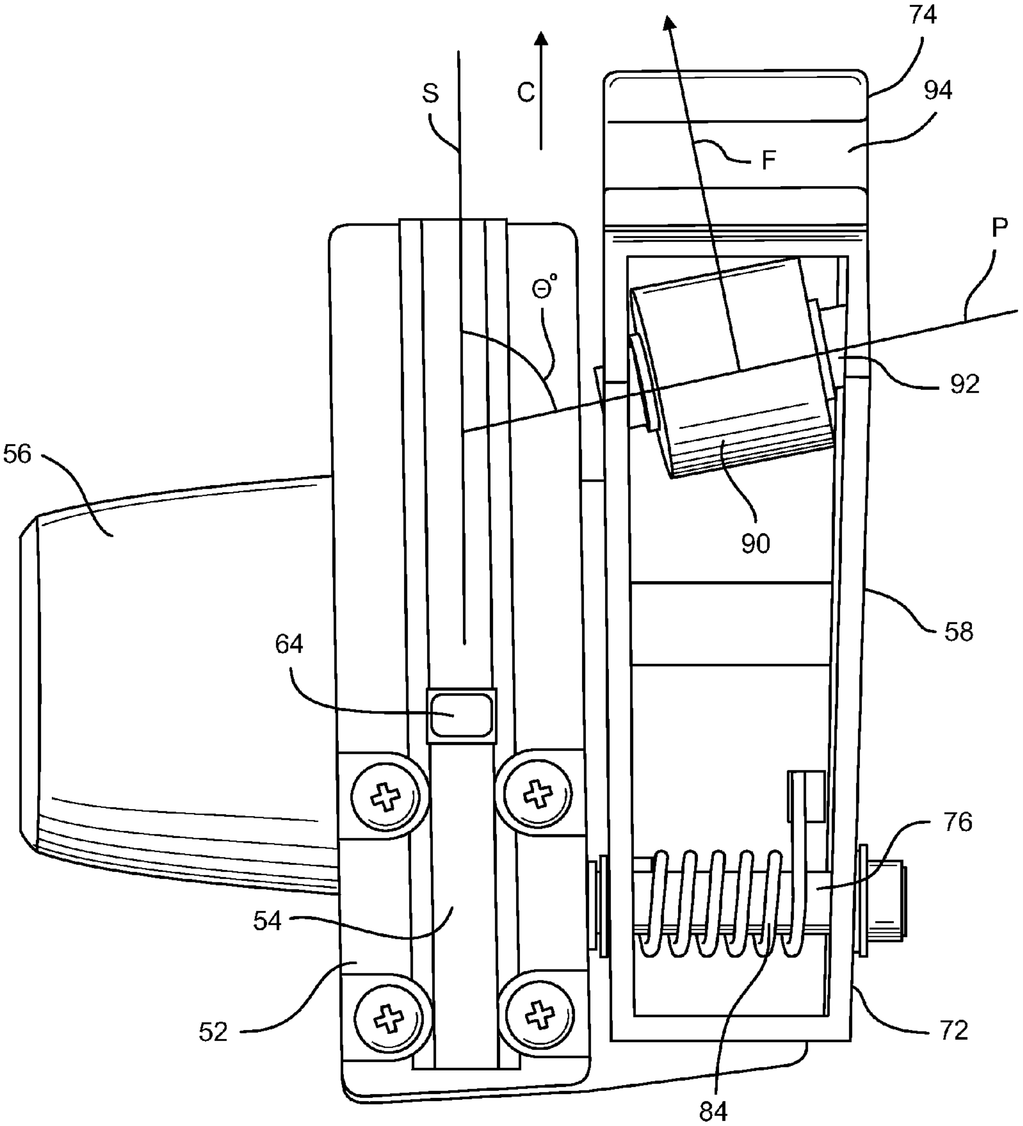
FIG. 5 depicts a bottom elevational view of the work piece guide assembly of FIG. 2.

In addition to the downward force, the arm 58 is configured to generate a lateral force for urging the work piece laterally toward the rip fence 18. To generate the lateral force, the pin 92 is arranged at an angle with respect to rip fence as best seen in FIG. 5. The roller 90 is formed of a suitable material, such as rubber, capable of generating friction with the top surface 88 of the work piece 86. The angled roller 90 thus generates a frictional force when contacted and rotated by the work piece moving in a direction parallel to a slot axis S defined by the elongated slot 20. The frictional force generated by the angled roller 90 is in a direction F (see FIG. 5) generally perpendicular to the axis of rotation P of the roller, i.e., the pin axis. Thus, as the work piece 86 is moved in the cutting direction C, the angled roller 90 generates a frictional force that urges the work piece in the direction F toward the rip fence 18. The pin 92 may be arranged at any suitable angle with respect to the slot axis S. In one preferred embodiment, the pin 92 is arranged with respect to the rip fence such that the pin axis P and an axis N perpendicular to the slot axis S define an acute angle Θ° wherein the angle Θ° is between approximately 85° and 95°.

The second end portion 74 of the arm 58 of the work piece guide assembly is also configured to serve as a pushing apparatus for applying an advancing force to the trailing end of a work piece in the cutting direction C. To enable a work piece pushing capability for the guide assembly, the second end portion 74 of the arm is provided with a notch structure 94 that defines a work piece contact surface 96. At least a portion of the work piece contact surface 96 of the notch 94 is arranged substantially perpendicular to the support surface 14 when the guide assembly 50 is attached to the rip fence 18. The notch structure 94 is located on the second end portion 74 of the arm 58 such that the roller 90 is interposed between the notch structure 94 and the first end portion 72 of the arm. Thus, the notch structure 94 is located in front of the roller 90 relative to the cutting direction C.

During operation, the work piece guide assembly 50 is fixed at a desired position with respect to the rip fence 18 using the locking mechanism 62 as described above. The work piece 86 is placed on the support surface 14 of the table with an edge of the work piece abutted against the guide surface 24 of the rip fence. The work piece 86 is then advanced in the cutting direction C while maintaining the guide assembly in fixed relation to the fence with the locking mechanism 62. The work piece 86 is moved underneath the second end portion 74 of the arm 58 of the work piece guide assembly. The arm 58 is biased toward the support surface 14 thus providing a downward force for maintaining the work piece 86 in contact with the support surface 14. As the work piece 86 is moved under the arm 58, the top surface 88 of the work piece 86 is contacted by the roller 90 attached to the second end portion 74 of the arm. The roller 90 is mounted at an angle with respect to the cutting direction C to generate frictional force in a direction toward the rip fence 18 thus maintaining the lateral edge of the work piece in contact with the rip fence.

The work piece 86 is advanced in the cutting direction C until a trailing end 98 (FIG. 6B) of the work piece 86 moves past the roller 90 and the roller 90 is spaced apart from, or no longer in contact with, the top surface 88 of the work piece 86. The work piece 86 is then further advanced in the cutting direction C until the trailing end 98 of the work piece 86 passes the work contact surface 96 defined by the notch structure 94 in the second end portion 74 of the arm. At which point, the notch structure 94 provides clearance for the work contact surface 96 to be positioned in contact with the trailing end 98 of the work piece 86. The locking mechanism 62 of the guide assembly 50 is then moved to its unlocked position, such as by depressing the actuator 68, so that the guide assembly 50 may be moved in relation to the rip fence 18. The unlocked guide assembly is then advanced in the cutting direction C while the contact surface 96 of the arm is positioned in contact with the work piece.

While the invention has been illustrated and described in detail in the drawings and foregoing description, the same should be considered as illustrative and not restrictive in character. It is understood that only the preferred embodiment(s) have been presented and that all changes, modifications and further applications that come within the spirit of the invention are desired to be protected.

What is claimed is:

1. A method of guiding a work piece on a table assembly with a guide assembly, with (i) the table assembly including a base defining support surface, a saw mechanism supported by the base, and a fence supported by the base, the fence defining an elongated slot, and (ii) the guide assembly including a body having a mating component received in the elongated slot of the fence, a handle supported by the body, an arm pivotably connected in relation to the body and defining a contact surface, and a roller rotatably connected to the arm, comprising:

advancing a work piece on the support surface along the fence and under the arm of the guide assembly in a cutting direction;

positioning the roller in contact with a top surface of the work piece as the work piece is being advanced under the arm, the arm being oriented so that the contact surface is positioned above the top surface of the work piece while the roller is in contact with the top surface of the work piece;

maintaining the guide assembly supported on the fence in a fixed position while the roller is in contact with the top surface of the work piece;

further advancing the work piece on the support surface until a trailing end of the work piece moves past the roller and the roller becomes spaced apart from the top surface;

pivoting the arm downwardly until the roller contacts the support surface and the contact surface is positioned facing the trailing end of the work piece after the trailing end of the work piece has moved past the roller; and moving the guide assembly in relation to the fence in the cutting direction after the roller is positioned in contact with the support surface and the contact surface is positioned facing the trailing end of the work piece so as to push the contact surface against the trailing end of the work piece and cause the work piece to further advance on the support surface, wherein the contact surface is positioned in front of the roller relative to the cutting direction so that the contact surface is moved into engagement with the trailing end of the work piece when the guide assembly is moved in the cutting direction with the roller positioned in contact with the support surface.

2. The method of claim 1, wherein:

the mating component of the body is located in the elongated slot of the fence, and the mating component is advanced within the elongated slot of the fence when the guide assembly is moved in relation to the fence.

3. The method of claim 1, further comprising:

cutting the work piece with the saw mechanism while the roller of the guide assembly is biased against a top surface of the work piece, and cutting the work piece with the saw mechanism while the contact surface of the arm is positioned in contact with the trailing end of the work piece, and the roller is positioned in contact with the support surface.

* * * * *